(12) United States Patent
Biskup, Sr. et al.

(10) Patent No.: US 6,700,224 B2
(45) Date of Patent: Mar. 2, 2004

(54) SECURITY AND ENERGY CONTROL SYSTEM

(75) Inventors: James H. Biskup, Sr., Aliquippa, PA (US); Rohn A. Sambol, Sr., Industry, PA (US); David V. Martin, Orlando, FL (US)

(73) Assignee: Energy Technologies, L.L.C., Aliquippa, PA (US)

( * ) Notice: Subject to any disclaimer, the term of this patent is extended or adjusted under 35 U.S.C. 154(b) by 0 days.

(21) Appl. No.: 10/275,147

(22) PCT Filed: Aug. 6, 2001

(86) PCT No.: PCT/US01/24568
§ 371 (c)(1),
(2), (4) Date: Nov. 1, 2002

(87) PCT Pub. No.: WO02/13218
PCT Pub. Date: Feb. 14, 2002

(65) Prior Publication Data
US 2003/0227220 A1 Dec. 11, 2003

Related U.S. Application Data
(60) Provisional application No. 60/222,972, filed on Aug. 4, 2000.

(51) Int. Cl.$^7$ .............................................. H01H 35/00
(52) U.S. Cl. ........................ 307/116; 307/38; 307/39; 307/40; 340/825.72; 340/521
(58) Field of Search ................................ 307/11, 30–40, 307/85, 116; 340/521, 522, 825.31, 825.71, 825.42; 236/47

(56) References Cited

U.S. PATENT DOCUMENTS

| | | | | |
|---|---|---|---|---|
| 4,101,886 A | * | 7/1978 | Grimes et al. | 165/237 |
| 4,723,593 A | * | 2/1988 | Kuribayashi | 165/11.1 |
| RE33,146 E | * | 1/1990 | Carrell et al. | 165/11.1 |
| 5,100,053 A | * | 3/1992 | Manson et al. | 236/47 |
| 5,156,203 A | * | 10/1992 | Funakoshi et al. | 165/207 |
| 5,285,961 A | * | 2/1994 | Rodriguez, Jr. | 236/47 |
| 5,318,224 A | * | 6/1994 | Darby et al. | 236/47 |
| 5,694,115 A | * | 12/1997 | Desatoff | 340/510 |
| 5,785,243 A | * | 7/1998 | Cross | 236/47 |
| 5,933,085 A | * | 8/1999 | Holcomb et al. | 340/5.66 |
| 6,019,284 A | * | 2/2000 | Freeman et al. | 235/380 |
| 6,114,816 A | * | 9/2000 | Nuckolls et al. | 315/324 |
| 6,254,009 B1 | * | 7/2001 | Proffitt et al. | 236/47 |
| 6,260,765 B1 | * | 7/2001 | Natale et al. | 236/47 |
| 6,275,166 B1 | * | 8/2001 | del Castillo et al. | 340/5.1 |
| 6,290,140 B1 | * | 9/2001 | Pesko et al. | 236/47 |

\* cited by examiner

*Primary Examiner*—Brian Sircus
*Assistant Examiner*—Sharon A. Polk
(74) *Attorney, Agent, or Firm*—Webb Ziesenheim Logsdon Orkin & Hanson, P.C.

(57) ABSTRACT

A presence detection and control system (2) outputs an identification code related to an individual, a motion signal in response to detecting motion in a field of view and/or a temperature signal related to an ambient temperature. A main control device (4) generates at least one wireless control signal based on the ID code, the motion signal and/or the temperature signal. A smart outlet (6) or a phone interrupter/dialer (8) can receive at least one wireless control signal. If the smart outlet (6) is responsive to the one wireless control signal, it connects an energy source to an energy consumption device (60, 62 or 64). If the phone interrupter/dialer (8) is responsive to the one wireless control signal, it conveys a message to a conductive communication line. This message is received by a central controller (90) which can log the message and/or a time the message was received.

18 Claims, 8 Drawing Sheets

SECURITY AND ENERGY CONTROL SYSTEM

This application claims the benefit of Provisional application Ser. No. 60/222,972, filed Aug. 4, 2000.

BACKGROUND OF THE INVENTION

1. Field of the Invention

The present invention is related to a presence detection and control system and, more specifically, to a combination security and energy control system for use in hotels/motels.

2. Description of the Prior Art

Presently, the hotel/motel industry is faced with two seemingly unrelated problems. Firstly, there presently exists no easy and convenient way to install a security system in each room of a hotel/motel for generating an alarm when an unauthorized person enters the room. Secondly, guests exiting a room of a hotel or motel often forget to setback a thermostat of a room heating, ventilation and air conditioning (HVAC) unit to reduce power consumption when they are not in the room. More specifically, during warm summer months, it is desirable for guests exiting their room to increase the room temperature to a level that is not uncomfortable, but results in a reduction in the energy consumed by the room HVAC unit when the guest is not present in the room. Similarly, in cold winter months, it is desirable for a guest to decrease the room temperature when exiting the room to a level that is not uncomfortable, but results in a reduction in the energy consumed by the room HVAC unit when the guest is not in the room. Presently, there exists no easy and convenient way to setback a room temperature when a guest exits the room and to return the room to a desired temperature when the guest returns to the room.

An example of an energy saving device which energizes and deenergizes electrical loads when such loads are not in use is disclosed in U.S. Pat. No. 5,495,984 to Santarriaga which issued on Mar. 5, 1996.

It is, therefore, an object of the present invention to overcome the above problems and others by providing a presence detection and control system which detects the presence or absence of a guest or intruder in a room and which controls the ambient temperature in the room based on the presence or absence of a guest in the room. It is an object of the present invention to provide a presence detection and control system which creates a record of when a guest or intruder enters a room and when the guest leaves the room. It is an object of the present invention to setback the ambient temperature in the room when the guest is absent from the room and to return the ambient temperature to a desired temperature when the guest returns to the room. Still other objects of the invention will be come apparent to those of ordinary skill in the art upon reading and understanding the following detailed description.

SUMMARY

Accordingly, we have invented a presence detection and control system which includes a card reader for generating an ID code in response to detecting an ID card, a motion sensor for generating a motion signal in response to detecting motion in a field of view, and a temperature sensor for generating a temperature signal based on a temperature detected by the temperature sensor. A radio transmitter generates at least one radio control signal based on the ID code, the motion signal and/or the temperature signal. A first radio receiver responsive to a first radio signal from the radio transmitter causes a first relay to connect an energy source to a power consumption device. A second radio receiver responsive to a second radio control signal from the radio transmitter causes a message to be conveyed on a communication line.

The system can also include a controller which receives and processes the message and (i) records a time of day the message is processed; (ii) records the ID code included in the message when the ID code matches a reference ID code; (iii) sets an alarm condition when the ID code does not match a reference ID code; and/or (iv) sets the alarm condition when the message does not include the ID code.

The system can also include a controller responsive to the temperature signal for causing the radio transmitter to generate the first radio control signal which causes the first relay to selectively connect/disconnect the energy source to or from the power consumption device as a function of the temperature signal.

DETAILED DESCRIPTION OF THE PREFERRED EMBODIMENTS

The present invention will be described with reference to the accompanying drawings wherein like reference numbers correspond to like elements.

Figure 1:
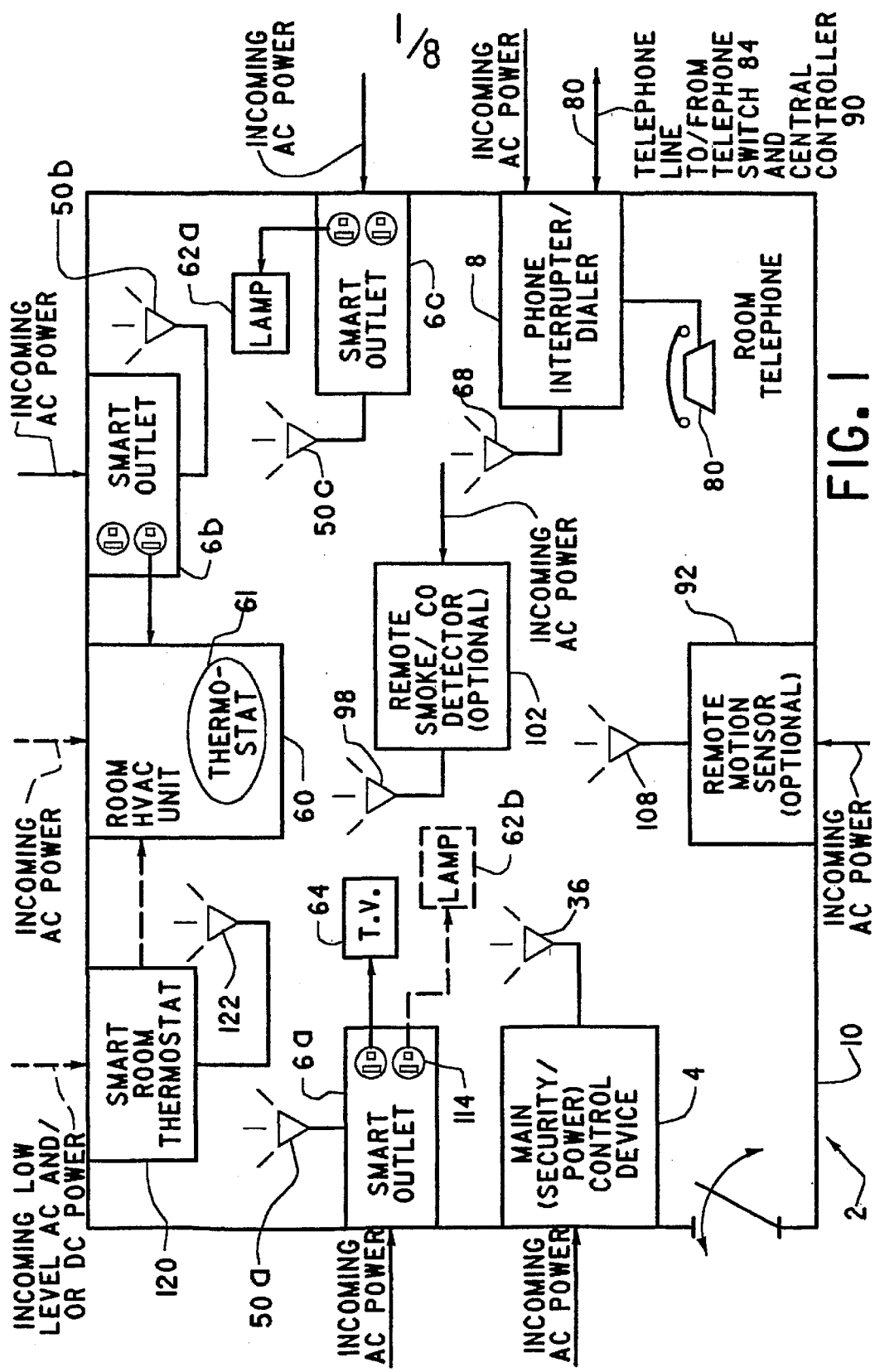
FIG. 1 is a block diagram of a presence detection and control system in accordance with the present invention.

With reference to FIG. 1, the present invention is a presence detection and control system 2 which can be utilized for security and energy control purposes in, for example, a hotel/motel. System 2 includes a main security/power control device 4 (hereinafter a "main control device") configured to transmit wireless radio control signals to one or more smart outlets 6 and a phone interrupter/dialer 8. Each smart outlet 6 and phone interrupter/dialer 8 is configured to receive at least one radio control signal from main control device 4. More specifically, main control device 4, each smart outlet 6 and phone interrupter/dialer 8 are configured so that main control device 4 can control the operation of each smart outlet 6 and/or phone interrupter/dialer 8 individually, simultaneously, or in some selected combination thereof.

Main control device 4, each smart outlet 6 and phone interrupter/dialer 8 are configured to be plugged into a standard wall outlet for receiving alternating current (AC) power therefrom. Each smart outlet 6 and phone interrupter/dialer 8 are positioned in a room 10, or a plurality of adjacent rooms (not shown), within the transmitting range of the radio control signals transmitted from main control device 4.

Preferably, each radio control signal is transmitted by main control device 4 in the FM frequency band. To avoid interference between presence detection and control systems 2 in adjacent rooms 10 of a hotel/motel, each presence detection and control system 2 is configured so that its radio control signals are transmitted in a manner that does not interfere with the operation of another presence detection and control system 2. To this end, presence detection and control systems 2 that are installed in rooms that are adjacent each other, either on the same floor or on adjacent floors, can be configured to operate on different FM frequency bands and/or in different time slices of a single FM frequency band. Other coding techniques which prevent radio control signals of one presence detection and control system 2 from interfering with the operation of another presence detection and control system 2 can also be utilized. To further avoid such interference, each presence detection and control system 2 is preferably configured to transmit radio control signals that remain essentially inside each room 10 or adjoining rooms of a hotel/motel in which each presence detection and control system 2 is installed.

Figure 2:
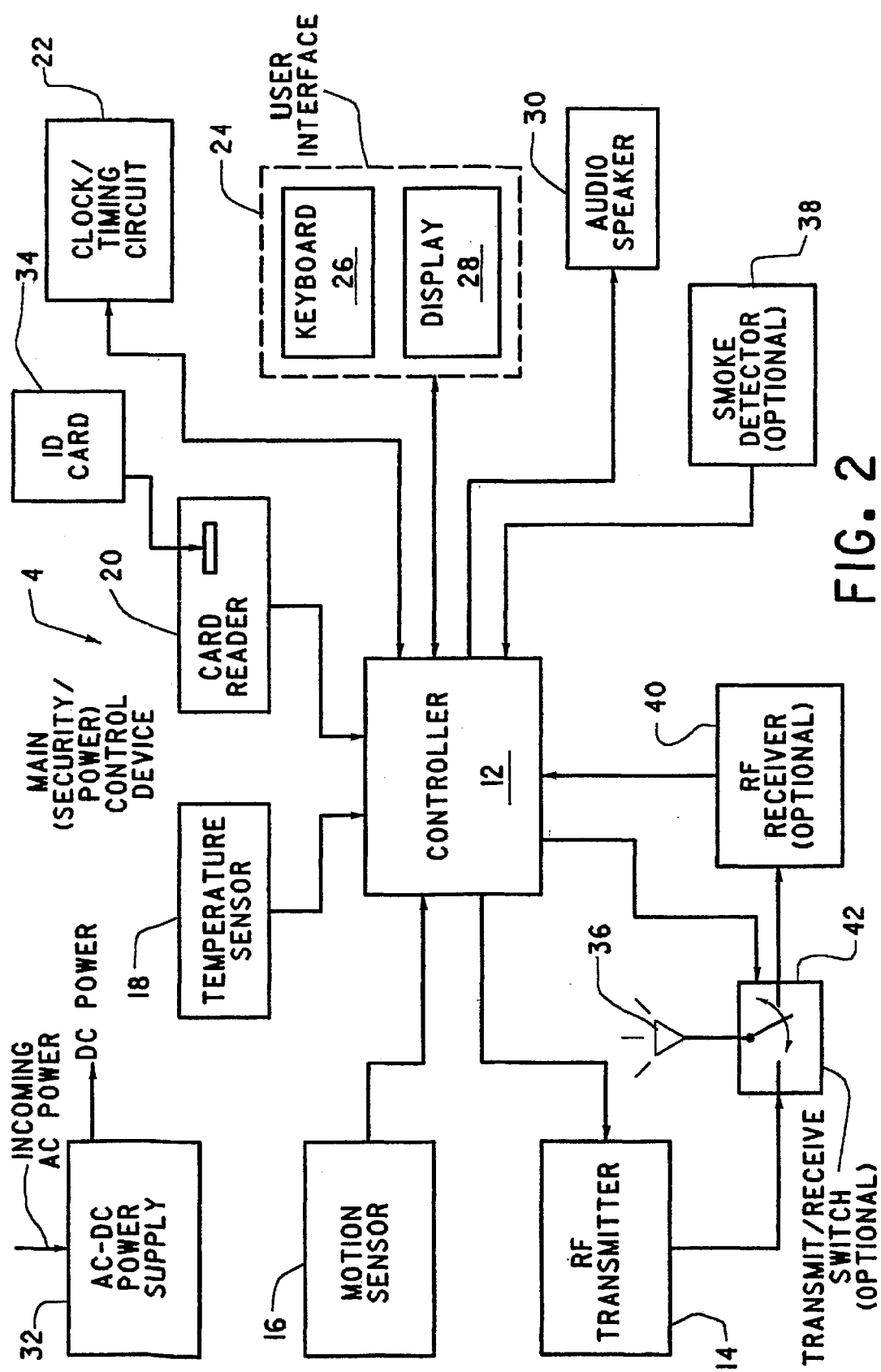
FIG. 2 is a detailed block diagram of the main security/power control device shown in FIG. 1.

With reference to FIG. 2 and with continuing reference to FIG. 1, main control device 4 includes a controller 12, an RF transmitter 14, a motion sensor 16, a temperature sensor 18, a card reader 20, a clock/timing circuit 22, a user interface including a keyboard 26 and a display 28, and an audio speaker 30. An AC/DC power supply 32 receives incoming AC power from a conventional AC source, such as a wall outlet, and provides DC power as necessary to the components of main control device 4.

Motion sensor 16 generates a motion signal which is supplied to controller 12 in response to motion sensor 16 detecting motion in a field of view of motion sensor 16. Temperature sensor 18 generates a temperature signal which is provided to controller 12. This temperature signal is related to a temperature detected by a temperature detecting element (not shown) of temperature sensor 18. Card reader 20 generates an identification (ID) code in response to detecting an ID card 34. Preferably, the ID code is magnetically recorded on ID card 34 and card reader 20 includes appropriate magnetic detection circuitry (not shown) for detecting the ID code when the ID card is positioned adjacent the magnetic detection circuitry. Motion sensor 16, temperature sensor 18 and card reader 20 are conventional in the art and will not be described further herein.

Clock/timing circuit 22 is preferably a real time clock that can be utilized by controller 12 to determine intervals of time. User interface 24 includes keyboard 26 which can be utilized by a user of main control device 4 to input data into controller 12 and display 28 which controller 12 can utilize to display operating parameters of main control device 4. Audio speaker 30 is connected to convert audio frequency signals from controller 12 into audio tones in a manner known in the art.

Controller 12 is preferably a conventional microprocessor based control system operating under the control of an embedded software program. Controller 12 preferably includes a microprocessor, a memory unit and any required interface circuitry required for interfacing controller 12 to any elements providing input to controller 12 or to any elements to be controlled by controller 12. The specifics of controller 12 have not been included in FIG. 2 for simplicity of illustration.

RF transmitter 14 is configured to receive data from controller 12 and to generate radio control signals which are broadcast via an antenna 36 for receipt by smart outlets 6 and/or phone interrupter/dialer 8. Preferably, this data is modulated based on the ID code received from card reader 20, the temperature signal received from temperature sensor 18 and/or the motion signal received from motion sensor 16.

Optionally main control device 4 can include a smoke detector 38 which supplies controller 12 with a smoke detection signal based on the detection of smoke by smoke detector 38 in a manner known in the art.

Main control device 4 can also include an optional RF receiver 40 and a transmit/receive switch 42. RF receiver 40 is configured to supply to controller 12 data corresponding to radio signals received by RF receiver 40 via antenna 36. Transmit/receive switch 42 selectively connects antenna 36 to RF transmitter 14 or RF receiver 40 under the control of controller 12 thereby enabling antenna 36 to be used for broadcasting radio control signals or for receiving radio signals.

Figure 3:
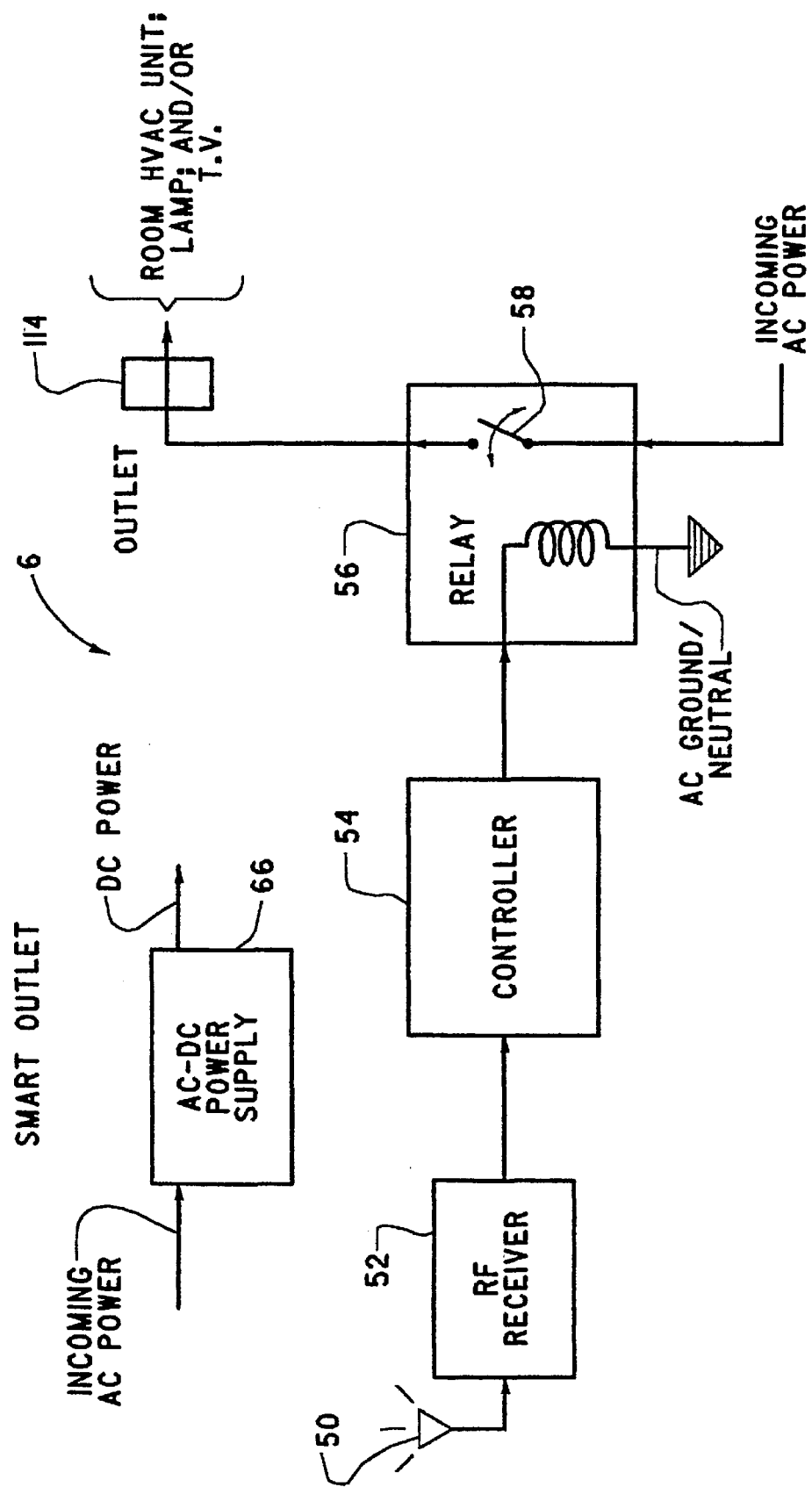
FIG. 3 is a detailed block diagram of the smart outlet shown in FIG. 1.

With reference to FIG. 3 and with continuing reference to FIGS. 1 and 2, each smart outlet 6 includes an antenna 50 which supplies radio control signals received from main control device 4 to an RF receiver 52. RF receiver 52 demodulates the received radio control signals into data which is supplied to a controller 54 for processing. Each smart outlet 6 has a data address which main control device 4 utilizes for the selective control thereof. This address can be stored in controller 54 of each smart outlet 6 when each smart outlet 6 is manufactured or can be established by jumpers and/or switches (not shown) in a manner known in the art when each smart outlet 6 is installed. Preferably, each controller 54 includes a processor, a memory unit and interface circuitry.

In order for main control device 4 to control each smart outlet 6, main control device 4 is programmed, either during manufacturing of main control device 4 or via user interface 24, to include the address of each smart outlet 6 to be controlled by main control device 4. These addresses are modulated along with the data supplied to RF transmitter 14 by controller 12 of main control device 4 for modulation into radio control signals broadcast via antenna 36.

If controller 54 determines that the data received from RF receiver 52 includes the address of controller 54, controller 54 responds by selectively energizing/deenergizing a relay 56. Relay 56 has a switch 58 connected at one end to an available source of incoming AC power, such as a wall outlet, and connected at its other end to one or more power consumption devices, such as a room HVAC unit 60, a lamp 62, a television 64, and the lice. Lastly, each smart outlet 6 includes an AC/DC power supply 66 which converts incoming AC power into DC power for use by RF receiver 52, controller 54 and relay 56.

Figure 4:
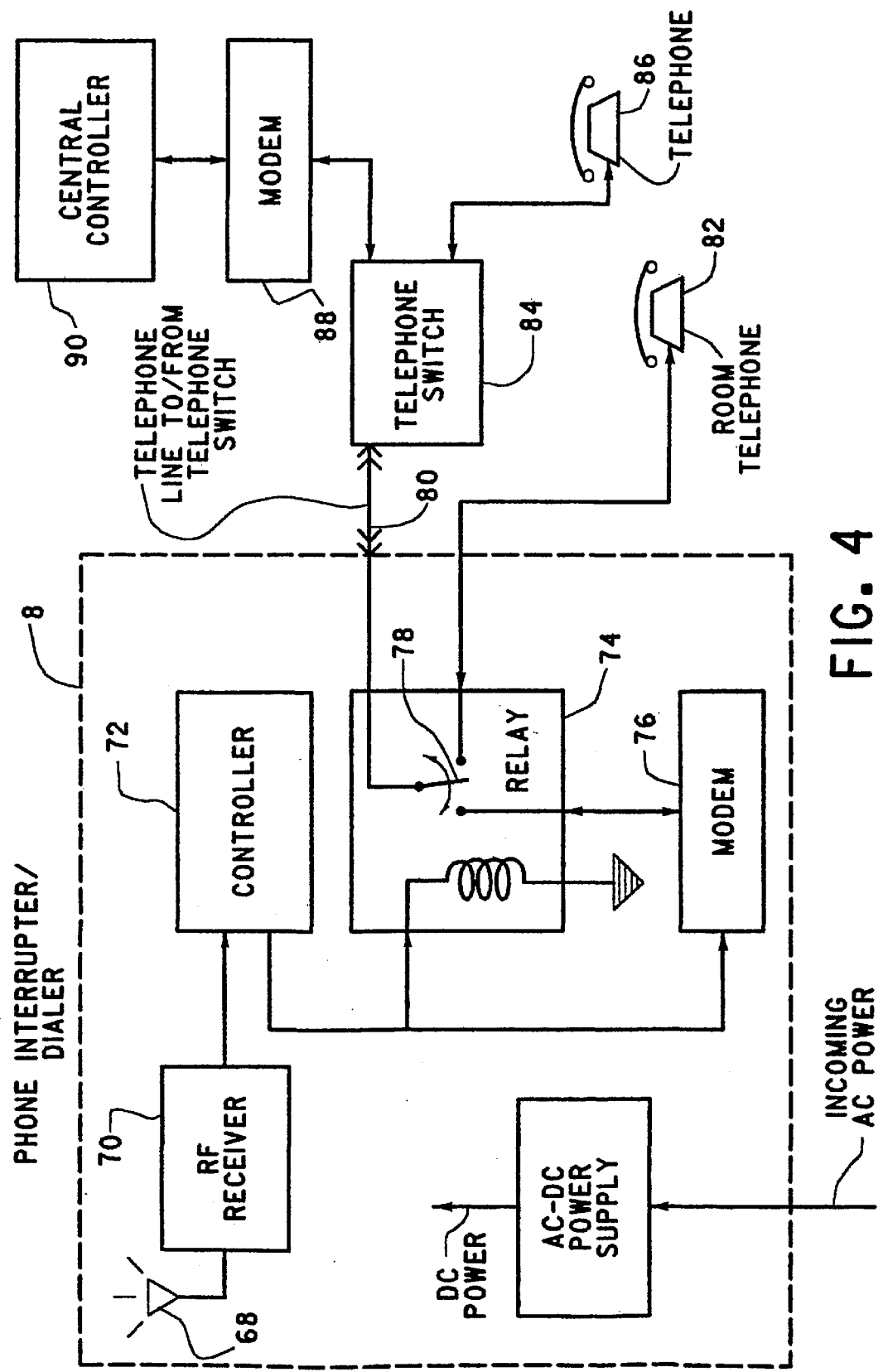
FIG. 4 is a detailed block diagram of the phone interrupter/dialer shown in FIG. 1.

With reference to FIG. 4 and with continuing reference to FIG. 1, phone interrupter/dialer 8 includes an antenna 68 which supplies radio control signals received from main control device 4 to an RF receiver 70. RF receiver 70 demodulates the received radio control signals into data which is supplied to a controller 72 for processing. Controller 72 is connected to a relay 74 and a modem 76. Relay 74 includes a switch 78 which can be selectively switched to connect a telephone line 80, connected to relay 74, between a room telephone 82 and an output port of modem 76. The other end of telephone line 80 is connected to a prior art telephone switch 84. Telephone switch 84 responds to dialing commands supplied on telephone line 80 to selectively connect telephone line 80 to another telephone 86 or to a modem 88 which interfaces telephone line 80 to a central controller 90 for processing of data transmitted from controller 72 to central controller 90 via modem 76.

Phone interrupter/dialer 8 has a data address which main control device 4 utilizes for the selective control thereof. This address can be stored in controller 72 when phone interrupter/dialer 8 is manufactured or can be established by jumpers and/or switches (not shown) in a manner known in the art when phone interrupter/dialer 8 is installed. Preferably, controller 72 includes a processor, a memory unit and interface circuitry.

In order for main control device 4 to control phone interrupter/dialer 8, main control device 4 is programmed, either during manufacturing of main control device 4 or via user interface 24, to include the data address of phone interrupter/dialer 8 to be controlled by main control device 4 in a manner to be described hereinafter. This address is modulated along with data supply to RF transmitter by controller 12 of main control device 4 for modulation into radio control signal broadcast via antenna 36.

In the absence of controller 72 receiving data from RF receiver 70 including the data address of controller 72, relay 74 has its contact 78 in a state connecting room telephone 82 to telephone line 80. However, if controller 72 receives data from data RF receiver 70 that includes the data address stored in controller 72, controller 72 causes relay 74 to set switch 76 to a state connecting modem 76 to telephone line 80. In this state, room telephone 82 is isolated from line 80.

The data received by controller 72 from RF receiver 70 can include, without limitation, information regarding the ID code generated by card reader 20, the motion signal generated by motion sensor 16 and/or the temperature signal generated by temperature sensor 18. After controller 72 causes relay 74 to connect modem 76 to telephone line 80, controller 72 causes modem 76 to dial the telephone number associated with modem 88. In response to receiving this dialing information, telephone switch 84 connects modem 76 to modem 88 in a manner known in the art. Controller 72 then transmits to modem 76 a message containing this information. Modem 76 modulates this message and transmits this message to modem 88 which demodulates the message and supplies it to central controller 90 for processing and/or retention.

Central controller 90 operates under the control of a software program for processing and/or retaining messages received from modem 88. Central controller 90 includes a processor, memory unit, mass storage unit and interface circuitry which, under the control of the software program, enables central controller 90 to process and store the information conveyed in the message received from modem 88. Central controller 90 preferably includes a real time clock (not shown) which enables central controller 90 to record a time of day when each message is received along with some or all of the information contained in each message. The specifics of central controller 90 have not been included in FIG. 4 for simplicity of illustration.

Figure 5:
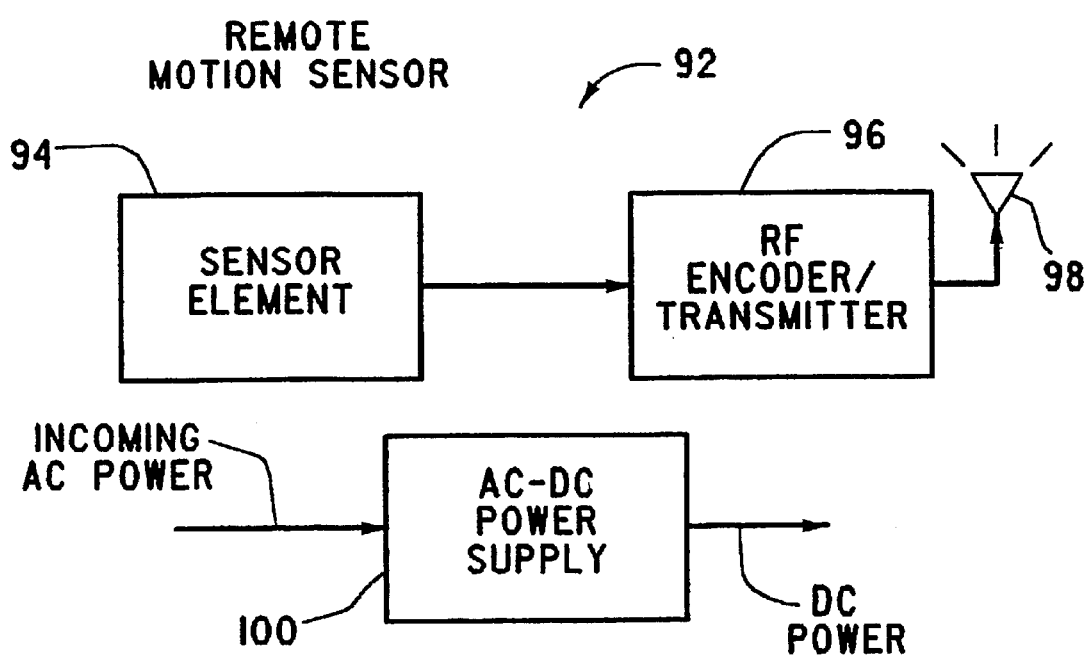
FIG. 5 is a detailed block diagram of the remote motion sensor shown in FIG. 1.

With reference to FIG. 5 and with continuing reference to FIG. 1, presence detection and control system 2 can include a remote motion sensor 92 in addition to or as an alternative to motion sensor 16 of main control device 4. Remote motion sensor 92 includes a sensor element 94 which generates a motion signal in response to detecting motion in a field of view of sensor element 94. This motion signal is supplied to an RF encoder/transmitter 96 which modulates the motion control signal and broadcasts the modulated motion control signal as a radio control signal via an antenna 98. Main control device 4 receives this radio control signal via antenna 36 when transmit/receive switch 42 connects antenna 36 to RF receiver 40. RF receiver 40 demodulates the motion control signal from the radio control signal received from remote motion sensor 92 and supplies it to controller 12 for processing. Remote motion sensor 92 also includes an AC/DC power supply 100 which receives AC power from a conventional AC source, such as a wall outlet, and converts the incoming AC power into DC power usable by sensor element 94 and RF encoder/transmitter 96.

Figure 6:
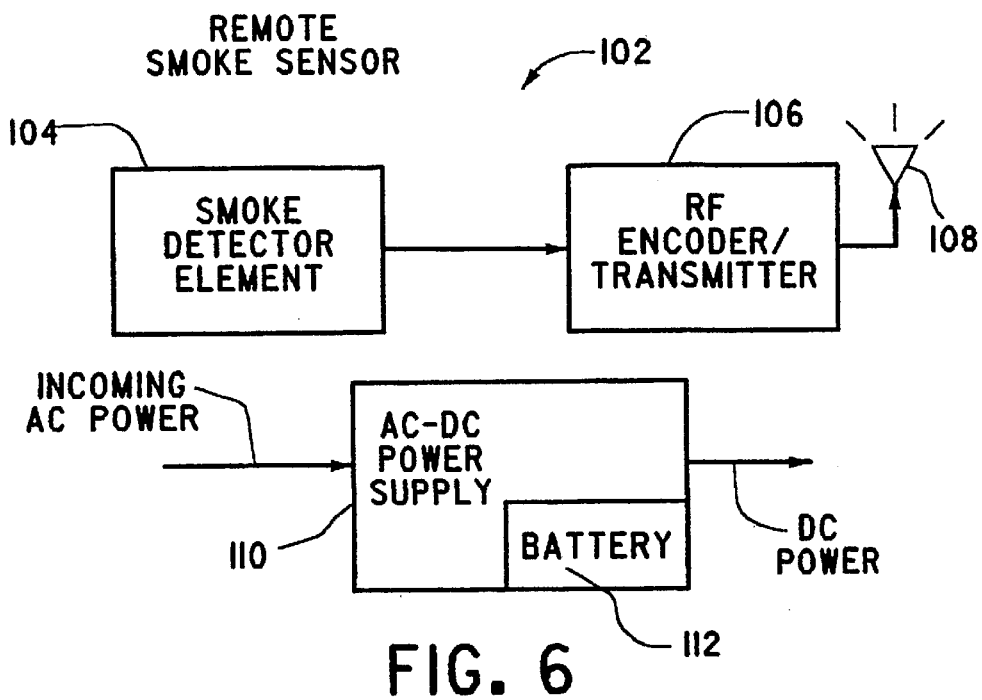
FIG. 6 is a detailed block diagram of the remote smoke detector shown in FIG. 1.

With reference to FIG. 6 and with continuing reference to FIG. 1, presence detection and control system 2 can include a remote smoke detector 102 in addition to or as an alternative to smoke detector 38 of main control device 4. Remote smoke detector 102 includes a smoke detector element 104 which generates a smoke signal in response to detecting the presence of smoke in room 10. This smoke signal is received by an RF encoder/transmitter 106 which modulates the smoke signal and which broadcasts the modulated smoke signal as a radio control signal via antenna 108. Main control device 4 receives this radio control signal via antenna 36 when transmit/receive switch 42 connects antenna 36 and RF receiver 40. RF receiver 40 demodulates the smoke signal from the radio control signal received from remote smoke detector 102 and supplies it to controller 12 for processing. Remote smoke detector 102 includes an AC/DC power supply 110 which receives AC power from a conventional AC source, such as a wall outlet, and which converts the incoming AC power into DC power usable by smoke detector element 104 and RF encoder/transmitter 106. Power supply 110 can be hard wired directly to the source of incoming AC power or can be connected thereto via a wall outlet. Power supply 110 preferably includes a battery 112 which supplies DC power in the event of an interruption of incoming AC power.

Figure 7:
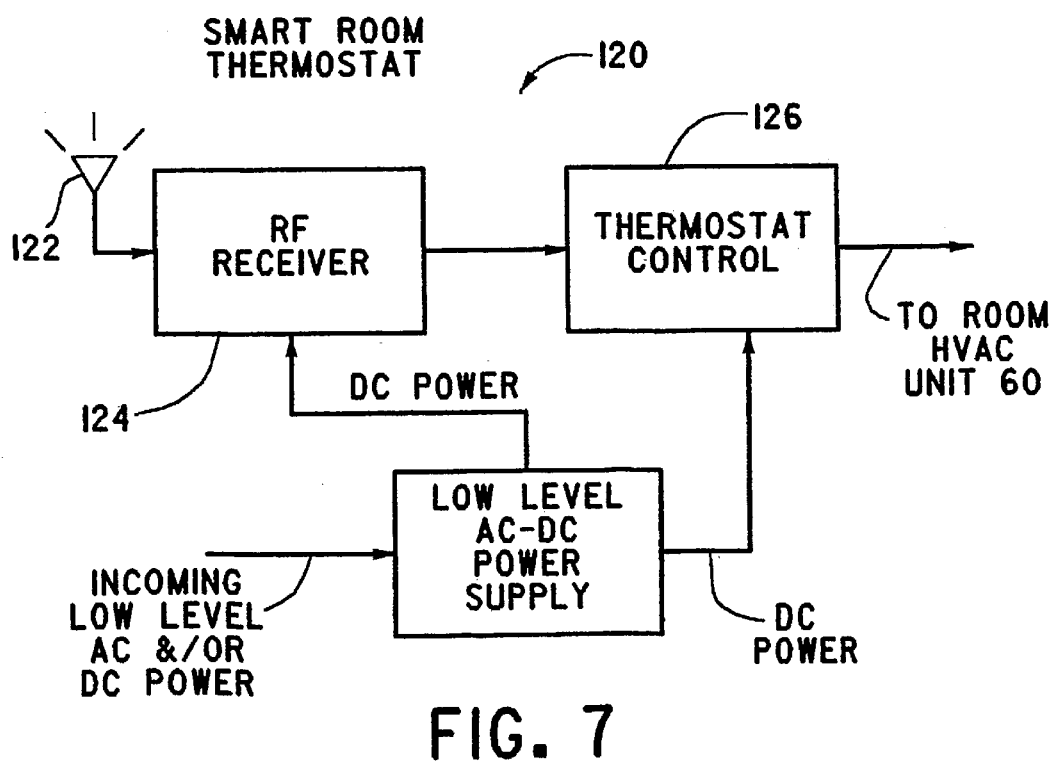
FIG. 7 is a detailed block diagram of the smart room thermostat shown in FIG. 1.

With reference to FIG. 7 and with continuing reference to FIG. 1, instead of supplying room HVAC unit 60 with incoming AC power via a smart outlet 6, e.g., smart outlet 6b, room HVAC unit 60 can be connected directly to the source of incoming AC power and the operation of room HVAC unit 60 can be controlled by a smart room thermostat 120, shown in phantom in FIG. 1. Smart room thermostat 120 replaces a conventional thermostat 61 connected to control room HVAC unit 60. In addition to providing user control of room HVAC unit 60 in the same manner as thermostat 61, smart room thermostat 120 includes an antenna which receives radio control signals broadcast by main control device 4 and supplies the received radio control signals to an RF receiver 124 which demodulates from the radio control signals data utilized to control a thermostat control 126. Thermostat control 126 can include a data address which enables main control device 4 to selectively communicate with smart room thermostat 120 via radio control signals including data modulated with the data address of thermostat control 126.

Thermostat control 126 performs all the essential functions of thermostat 61. Namely, thermostat control 126 enables user selection of a desired ambient temperature in room 10. In addition, thermostat control 126 can also act on data received from RF receiver 124 to control the operation of room HVAC unit 60 in a manner to be described hereinafter. Since thermostat 61 is configured to operate from incoming low level AC and/or DC power supplied via room HVAC unit 60, smart room thermostat 120 is preferably configured likewise. To this end, smart room thermostat 120 includes a low level AC/DC power supply 128 which converts low level AC and/or DC power received from room HVAC unit 60 into DC power for use by RF receiver 124 and thermostat control 126.

In the embodiment of presence detection and control system 2 shown in FIG. 1, main control device 4, smart outlets 6a, 6b, and 6c, and phone interrupter/dialer 8 are each received in separate enclosures. Each smart outlet 6 includes one or more outlets 114 connected to relay 56 and configured to receive the plug of a power chord of television 64, room HVAC unit 60 or lamp 62. Each smart outlet 6 includes a plug configured to be received in a wall outlet for receiving incoming AC power therefrom. Each smart outlet 6 can be configured to supply power to a different size load. For example, smart outlets 6a and 6c can be configured to supply power at 120 volts to like rated power consumption devices, such as television 64 and lamp 62. Thus, smart outlets 6a and 6c will each include a plug configured to mate with a 120 volt wall outlet and may include relays 56 having switches 58 rated to convey power at 120 volts. In contrast, smart outlet 6b may be configured to supply power at 220 volts to room HVAC unit 60. Accordingly, smart outlet 6b will include a plug configured to mate with a 220 volt wall outlet and may include relay 56 having switch 58 rated to convey power at 220 volts.

Preferably, main control device 4 and phone interrupter/dialer 8 each include a plug configured to mate with a conventional wall outlet for receiving incoming AC power therefrom.

As discussed above, main control device 4, phone interrupter/dialer 8 and the one or more smart outlet 6 forming presence detection and control system 2 are configured so that main control device 4 can selectively address and, hence, control each smart outlet 6 and phone interrupter/dialer 8, independent of each other.

An exemplary operation of presence detection and control system 2 will now be described with reference to the flow chart of FIGS. 8a and 8b and with continuing reference to FIGS. 1 and 2. Upon initially receiving incoming AC power, main control device 4 initializes in start step 130. After initialization, program flow advances to step 132 where a decision is made whether ID card 34 is received in a slot of card reader 20. If ID card 34 is received in the slot of card reader 20, program flow advances to step 134 where controller 12 determines if ID card 34 was just inserted into the slot of card reader 20. If not, program flow advances to step 136 which returns program flow to start step 130. If, however, controller 12 determines that ID card 34 was just received in card reader 20, program advances to step 138.

In step 138, main control device 4 generates a radio control signal for receipt by phone interrupter/dialer 8. This radio control signal includes the data address of phone interrupter/dialer 8, the ID code recorded on ID card 34 and a command for phone interrupter/dialer 8 to report the ID code to central controller 90. Central controller 90 records this ID code along with the time the ID code was received by central controller 90 as an indication that the individual associated with the ID code entered room 10 at that time. To avoid unauthorized individuals having ID cards 34 from entering room 10, central controller 90 can include a list of ID codes authorized to enter room 10. In response to receiving an ID code that does not match an ID code in the list authorized to enter room 10, central controller 90 can initiate an alarm condition to which security personnel and/or local law enforcement officers can respond.

Next, program flow advances to step 140 where main control device 4 transmits one or more radio control signals which include the data address of one or more smart outlets 6. These one or more radio control signals cause or enable each smart outlet 6 having its data address included in the radio control signals to close its relay 56 thereby connecting its source of incoming power to the power consumption device connected thereto. Once each smart outlet 6 is enabled, it remains enabled until affirmatively disabled by radio control signals from main control device 4 or by the interruption of AC power to each smart outlet 6. After step 140, program flow advances to step 136 which returns program flow to start step 130.

Returning to step 132, if main control device 4 determines that ID card 34 is not received in the slot of card reader 20, program flow advances to step 142. In step 142, main control device 4 determines if card 34 was just removed from the slot of card reader 20. If not, program flow advances to step 144.

In step 144, main control device 4 determines if motion sensor 16 has generated a motion signal in response to detecting motion in a field of view. If motion sensor 16 has not generated a motion signal, program flow advances to step 146.

In step 146, main control device 4 detects if a temperature signal output by temperature sensor 18 is within a setback temperature limit. This setback temperature limit is utilized by main control device 4 to control the ambient temperature in room 10 in the absence of motion sensor 16 detecting motion in room 10 when ID card 34 is not received in the slot of card reader 20. More specifically, when ID card 34 is not received in the slot of card reader 20 and motion sensor 16 is not generating a motion signal, main control device 4 assumes control of room HVAC unit 60 over the setpoint temperature of thermostat 61. To this end, main control device 4 changes the ambient temperature in room 10 in order to conserve the power consumed by room HVAC unit 60 over the setpoint temperature of thermostat 61. For example, if thermostat 61 of room HVAC unit 60 is set to a desired setpoint temperature, main control device 4 will utilize the temperature signal output by temperature sensor 18 to control smart outlet 6b to cycle room HVAC unit 60 on and off in a manner that saves electrical energy over the control provided by thermostat 61. For example, if thermostat 61 is set to a setpoint temperature of 76° F. and the ambient temperature outside of room 10 is such that the ambient temperature inside room 10 will increase over time, main control device 4 will cause smart outlet 6b to cycle power to room HVAC unit 60 so that the temperature in room 10 increases to a setback temperature, e.g., 84° F., where room HVAC unit 60 can readily return room 10 to the setpoint temperature of thermostat 61 when ID card 34 is subsequently received in the slot of card reader 20 and when motion is detected in room 10 by motion sensor 16. Similar comments apply in respect of an ambient temperature outside of room 10 which causes the ambient temperature in room 10 to decrease when room HVAC unit 60 is not operating in accordance with the setpoint temperature of the thermostat 61. In this example, however, the setback temperature will be lower, e.g., 68° F., than the setpoint temperature, e.g., 76° F., of the thermostat 61.

If main control device 4 determines in step 146 that the ambient temperature of room 10 detected by temperature sensor 18 is within the temperature setback limit, program flow advances to step 148. In step 148, main control device 4 determines if at least smart outlet 6b is enabled. If smart outlet 6b is not enabled, program flow advances to step 150 for return of program flow to start step 130. If, however, at least smart outlet 6b is enabled, program flow advances to step 152 where main control device 4 generates a radio control signal which causes smart outlet 6b to disable or disconnect room HVAC unit 60 from the source of incoming AC power. From step 152, program flow advances to step 150 for return of program flow to start step 130.

Returning back to step 146, if the ambient temperature is outside the setback temperature limit, program flow advances from step 146 to step 154. In step 154, main control device 4 transmits a radio control signal which causes at least smart outlet 6b to enable thereby connecting room HVAC unit 6 to the source of incoming AC power. From step 154, program flow advances to step 156 for return of program flow to start step 130. Preferably, smart outlet 6b is controlled independent of smart outlet 6a and/or 6c to avoid unnecessarily cycling power to lamps 62 and/or television 64. However, this is not to be construed as limiting the present invention.

As can be seen, steps 146–156 enable main control device 4 to assume control of room HVAC unit to setback the temperature of room 10 when ID card 34 is not inserted in card reader 20 and when motion is not detected in room 10. This can result in tremendous energy savings in hotel/motel rooms where guests often do not setback the setpoint temperature of thermostat 61 upon exiting room 10.

Returning back to step 144, if ID card 10 is not received in card reader 20, and motion sensor 16 detects motion, program flow advances to step 158. In step 158, main control device 4 waits a predetermined interval, e.g., 30 seconds, before advancing program flow to step 160. In step 160, a determination is made if card reader 20 has generated an ID code in response to receiving ID card 34. If the ID code is generated before the predetermined interval expires, program flow advances to step 162 for return of program flow to start step 130. If, however, the ID code is not generated before the predetermined interval expires, program flow advances from step 160 to step 164.

In step 164, main control device 4 transmits a radio control signal which causes phone interrupter/dialer 8 to convey to central controller 90 a message including an indication that the ID code was not received before the predetermined interval expired. This indication may include data notifying central controller 90 that an intruder has entered room 10. In response to receiving this message, central controller 90 stores the message and, preferably, the time of day the message was received, and sets an alarm condition to which security personnel and/or local law enforcement officers can respond. In addition, central controller 90 can coact with cameras (not shown) positioned outside of room 10 to record visual images of the intruder exiting room 10 for later identification purposes.

Program flow then advances from step 164 to step 166 where main control device 4 waits an interval after reporting the presence of the intruder in room 10. From step 166, program flow advances to step 168 for a return of program flow to start step 130.

Returning to step 142, if main control device 4 determines that ID card 34 was just removed from card reader 20, program flow advances to step 170. In step 170, main control device 4 transmits radio control signals which cause each smart outlet 6 to disable, thereby isolating the power consumption device connected to each smart outlet 6 from the source of incoming power. Thereafter, program flow advances from step 170 to step 172 where main control device 4 transmits a radio control signal to phone interrupter/dialer 8. This radio control signal causes phone interrupter/dialer 8 to transmit to central controller 90 a message indicating that ID card 34 was just removed from card reader 20. This indication may include a message that guests are exiting room 10. From step 172, program flow advances to step 174 where main control device 4 waits a predetermined interval before advancing to step 176 for return of program flow to start step 130.

Figure 8A:
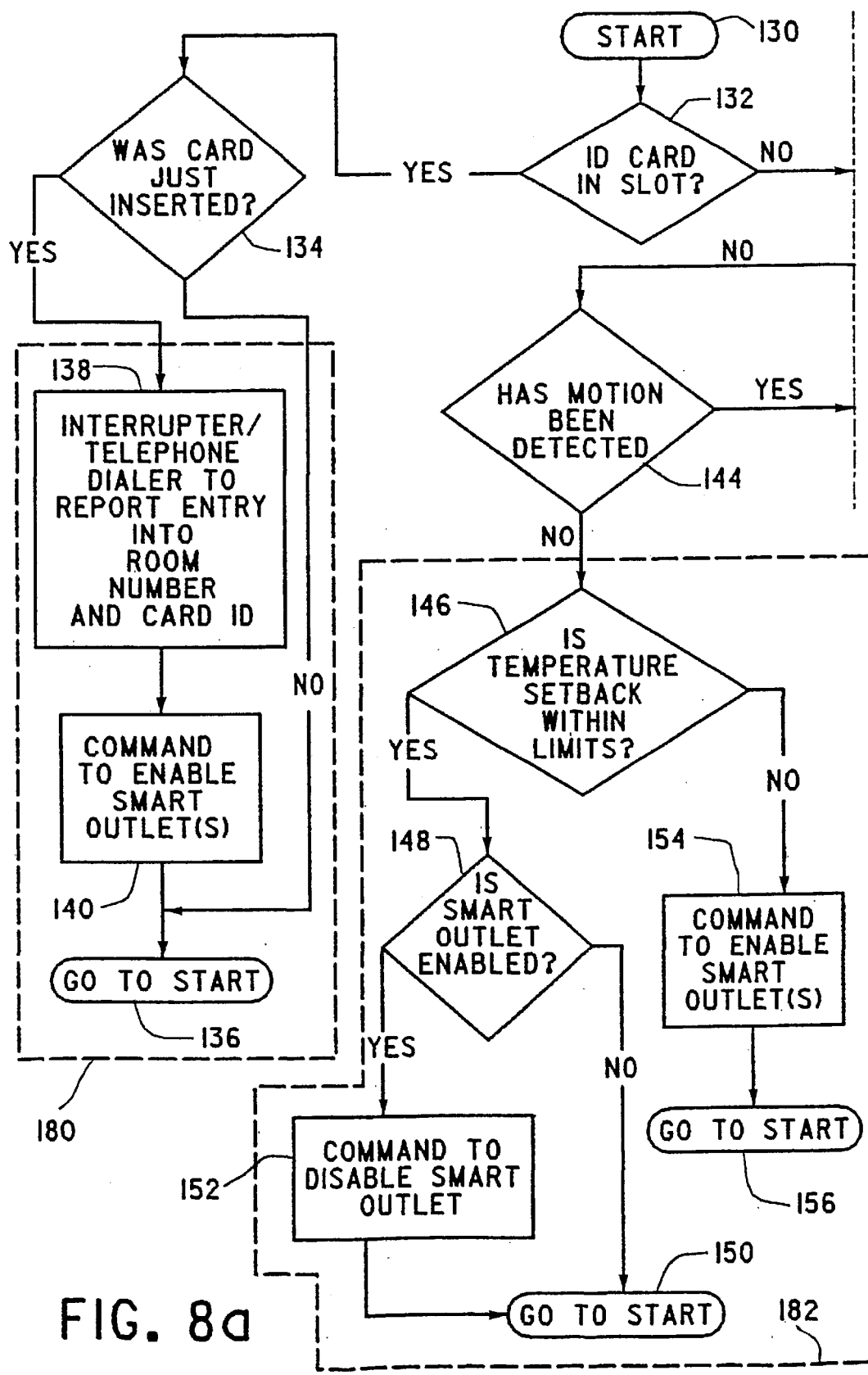
FIGS. 8a and 8b are a flow chart of the operation of the presence detection and control system shown in FIG. 1.
Figure 8B:
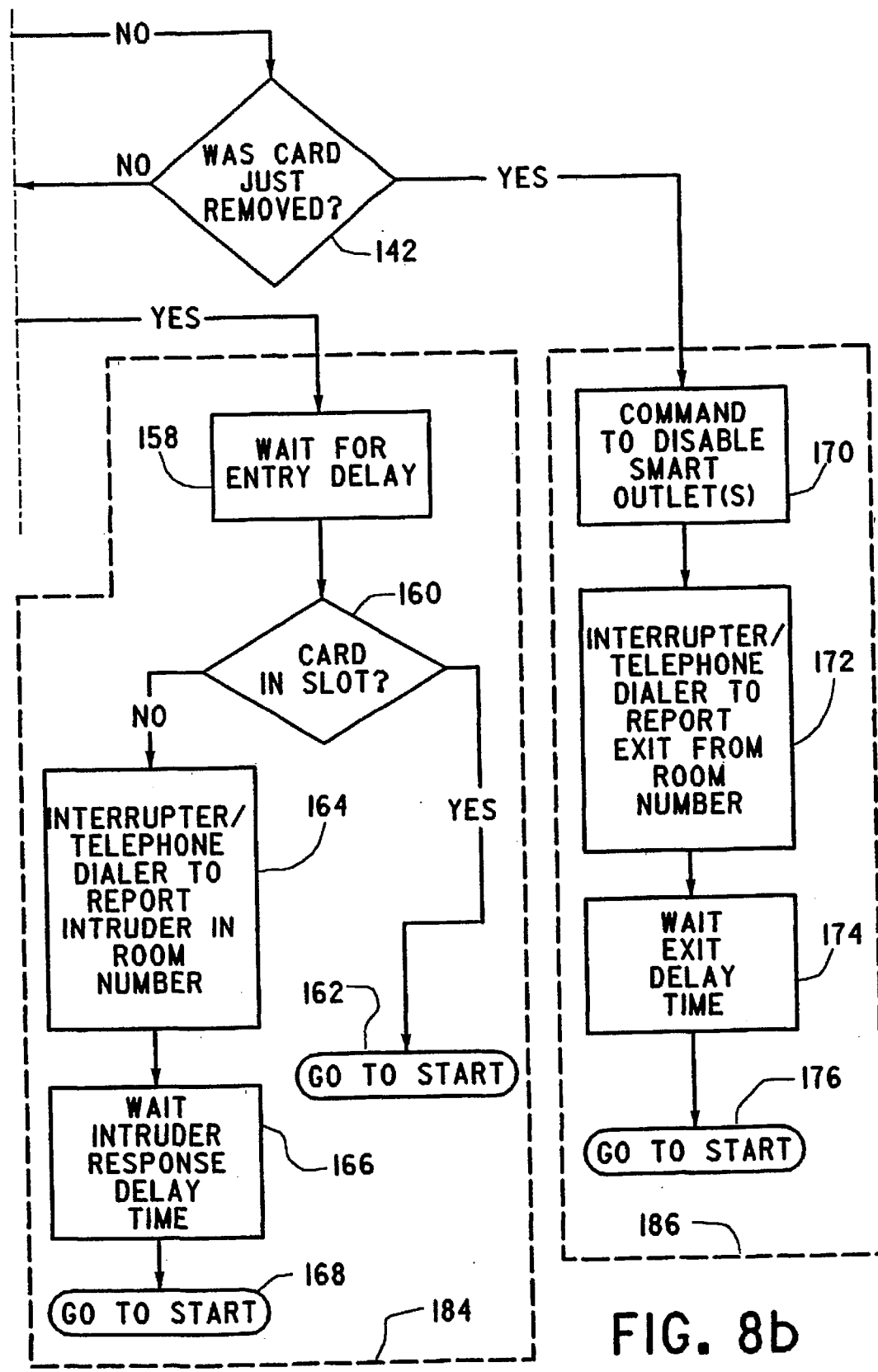

It should be appreciated that computer software operating presence detection and control system 2 in accordance with the flow diagram shown in FIGS. 8a and 8b implements four routines 180, 182, 184 and 186 which are individually selected based upon the presence or absence of ID card 34 in the slot of card reader 20, an interval of time ID card 34 was inserted or removed from the slot, and the detection of motion by motion sensor 16. Routine 180 includes steps 136, 138 and 140 which either cause central controller 90 to be notified of the ID code encoded in ID card 34 when it is just received in the slot of card reader 20 or to return to start step 130 when ID card 34 has been received in the slot of card reader 20 for more than a first predetermined interval of time, e.g., 5 seconds.

Routine 182 is called when ID card 34 has been removed from card reader 20 for more than a second predetermined interval of time, e.g., 30 seconds, and no motion is detected by motion sensor 16. Routine 182 includes steps 146–156 for controlling smart outlet 6b to cause room HVAC unit 60 to adjust the ambient temperature of room 10 to a setback temperature when no guest is present in room 10. Alternatively, instead of controlling the ambient temperature of room 10 to a setback temperature, main control device 4 can cause room HVAC unit 60 to operate at a fixed duty cycle, e.g., 5 minutes on and 15 minutes off.

Routine 184 executes when ID card 34 is removed from card reader 20 for more than the second predetermined interval of time and motion is detected by motion sensor 16. Routine 184 includes steps 158–168 which detect whether ID card 34 is received in the slot of card reader 20 within a third predetermined interval of time, e.g., 30 seconds. If ID card 34 is received in the slot of card reader 20 within the third predetermined interval, routine 184 returns program flow to start step 130 without talking any action. However, if ID card 34 is not received in the slot of card reader 20 within the third predetermined interval of time, main control device 4 causes central controller 90 to receive via phone interrupter/dialer 8 a message indicating the presence of an intruder in room 10. Thereafter, program flow advances to start step 130 after an intruder delay interval executes in step 166.

Lastly, routine 186 executes if ID card 34 was just removed from card reader 20 within a fourth predetermined interval of time. Routine 186 includes steps 170–176 which disable smart outlets 6 and which cause central controller 90 to receive a message that ID card 34 has been removed from card reader 20, which message suggests that a guest is exiting room 10.

By continuously, selectively executing routines 180, 182, 184 and 186, the presence of an authorized guest or an unauthorized intruder in room 10 can be monitored and recorded. In addition, when an authorized guest or staff member, such as cleaning personnel, enter room 10 and insert ID card 34 in the slot of card reader 20, the control of room HVAC unit 60 is relinquished to thermostat 61 which causes room HVAC unit 60 to operate to return the ambient temperature in room 10 to the temperature set at thermostat 61. In contrast, if ID card 34 has been removed from card reader 20 for a predetermined interval, e.g., 30 seconds, and motion sensor 16 does not detect motion in room 10, room HVAC unit 60 is controlled by smart outlet 6b to adjust the ambient temperature in room 10 to a setback temperature under the control of main control device 4. Lastly, if motion is detected in room 10 when ID card 34 has been removed from card reader 24 for longer then a predetermined interval, and if ID card 34 is not inserted in card reader 20 for another predetermined interval after motion is detected, central controller 90 receives a message indicative of the absence of ID card 30 in card reader 20 and the detection of motion in room 10, which message suggests the presence of an unauthorized intruder in room 10.

Preferably, one or more ID cards 34 are issued to one or more guests staying in room 10. To encourage the use of ID cards 34, audio speaker 30 of main control device 4 is caused to generate a tone when motion is initially detected in room 10 and when an ID card 34 is not received in the slot of card reader 20. When ID card 34 is received in the slot of card reader 20, main control device 4 causes audio speaker 30 to terminate generating the tone. This tone has the additional benefit of notifying an intruder into room 10 that their presence has been detected whereupon, it is believed, the intruder will exit room 10 before committing larceny. To further encourage use of ID cards 34, the tone generated by audio speaker 30 can increase in volume if ID card 34 is not received in the slot of card reader 20 a predetermined interval of time after motion is initially detected in room 10.

As can be seen, the present invention is a presence detection and control system, and, more specifically, a security and energy control system which can detect and record the presence or absence of an authorized guest or staff member in room 10, the presence of an unauthorized intruder in room 10 and which can selectively control the ambient temperature in room 10 as a function of the presence or absence of an authorized guest or staff member therein.

The present invention has been described with reference to the preferred embodiments. Obvious modifications and alterations will occur to others upon reading the preceding detailed description. For example, instead of utilizing smart outlet 6a to control room HVAC unit 60, smart room thermostat 120 can replace thermostat 61 for controlling the selected application of incoming low level power to room HVAC unit 60 to control the operation thereof under the control of main control device 4. In addition, while described in connection with the use of telephone line 30 for communicating messages between phone interrupter/dialer 8 and central controller 90, a computer network, such as a local area network or a wide area network, can be utilized to communicate messages to central controller 90 via suitable computer cabling. In this embodiment, relay 74 and modem 76 of phone interrupter/dialer 8 are replaced with a network interface card (not shown), such as an Ethernet card, for communicating with the computer network utilizing an established or custom protocol. Lastly, the operation of presence detection and control system 2 can include other steps and/or routines other than those shown in the flow chart of FIGS. 8a and 8b. For example, main control device 4 can cause phone interrupter/dialer 8 to immediately transmit a message to central controller 90 indicative of the detection of motion in room 10 when an ID card 34 is not received in the slot of card reader 20. Thereafter, if central controller 90 does not receive an indication from main control device 4 that an ID card 34 is received in the slot of card reader 20 within a predetermined interval, central controller 90 can initiate an alarm condition without prompting from main control device 4. It is intended that the invention be construed as including all such modifications and alterations insofar as they come within the scope of the appended claims or the equivalents thereof.

We claim:

1. A presence detection and control system comprising:
   a card reader for generating an identification (ID) code in response to detecting an ID card;
   a motion sensor for generating a motion signal in response to detecting motion in a field of view of the motion sensor;
   a temperature sensor for generating a temperature signal based on a temperature detected thereby;
   a transmitter for generating at least one wireless control signal based on the ID code, the motion signal and/or the temperature signal;
   a first relay connected between an energy source and an energy consumption device;
   a first receiver responsive to a first wireless control signal from the transmitter for causing the first relay to connect the energy source to the power consumption device;
   means for conveying a message on a communication line; and
   a second receiver responsive to a second wireless control signal from the transmitter for causing the conveying means to convey the message on the communication line, wherein the conveying means includes a first controller for producing the message based on the second wireless control signal, transmitting means responsive to the first controller for transmitting the message on the communication line and a second relay connected between the transmitting means and the communication line, the second relay responsive to the first controller for connecting the transmitting means to the communication line.

2. The system as set forth in claim 1, wherein the transmitting means includes a modem.

3. The system as set forth in claim 1, further including a second controller responsive to the motion signal for causing the transmitter to output the second wireless control signal which causes the conveying means to convey the message including an indication that the motion signal was generated.

4. The system as set forth in claim 3, wherein the second controller is responsive to the motion signal and/or the temperature signal for further causing the transmitter to generate the first wireless control signal.

5. The system as set forth in claim 1, further including a second controller responsive to the motion signal and the ID code, wherein:
   the second controller determines if a predetermined interval expires from a time when the motion signal is generated;
   if the ID code is generated before the predetermined interval expires, the second controller causes the transmitter to generate the second wireless control signal which causes the conveying means to convey the message including the ID code; and
   if the ID code is not generated before the predetermined interval expires, the second controller causes the transmitter to generate the second wireless control signal which causes the conveying means to convey the message including an indication that the ID code was not received before the predetermined interval expired.

6. The system as set forth in claim 1, further including:
   a second controller responsive to the motion signal and the ID code for determining if the ID code is generated within a predetermined interval after the motion signal is generated and for causing the conveyed message to include an indication thereof; and
   a third controller responsive to the conveyed message for setting an alarm condition when the conveyed message includes the indication that the ID code was not generated before the expiration of the predetermined interval.

7. The system as set forth in claim 1, further including:

a second controller responsive to the ID code for causing the conveyed message to include the ID code; and a third controller responsive to the conveyed message for setting an alarm condition when the ID code does not match a reference ID code.

8. The system as set forth in claim 1, further including:

means for receiving the conveyed message from the communication line; and a second controller which records data related to each received message and/or a time each received message is received by the receiving means.

9. The system as set forth in claim 1, wherein:

the ID code is magnetically recorded on the ID card; and the card reader includes means for detecting the ID code when the ID card is positioned adjacent or moves adjacent the card reader.

10. The system as set forth in claim 1, further including a second controller responsive to the temperature signal for causing the transmitter to generate the first wireless control signal which causes the first relay to selectively connect/disconnect the energy source to/from the power consumption device as a function of the temperature signal or a predetermined duty cycle.

11. A presence detection and control system comprising;

means for outputting an identification (ID) code related to an identity of an individual;

means for producing a motion signal in response to detecting motion in a field of view;

means for producing a temperature signal related to an ambient temperature;

means for generating at least one wireless control signal based on the ID code, the motion signal and/or the temperature signal;

means for receiving the at least one wireless control signal; and at least one of (i) means for connecting an energy source to an energy consumption device in response to the receiving means receiving the at least one wireless control signal and (ii) means for conveying a message to a communication line in response to the receiving means receiving the at least one wireless control signal, wherein the receiving means includes at least one of:

a first receiver responsive to a first wireless control signal for causing the connecting means to connect the energy source to the energy consumption device; and a second receiver responsive to a second wireless control signal for causing the conveying means to convey the message to the communication line.

12. The system as set forth in claim 11, further including means for determining when a predetermined interval expires from a time when the motion signal is generated, wherein:

in response to output of the ID code before expiration of the predetermined interval, the generating means generates the second wireless control signal which causes the conveying means to convey the message including the ID code; and in response to expiration of the predetermined interval before output of the ID code, the generating means generates the second wireless control signal which causes the conveying means to convey the message excluding the ID code.

13. The system as set forth in claim 12, further including means for processing the message conveyed to the communication line including at least one of:

(i) recording a time of day the message is processed;

(ii) recording the ID code included in the message when the ID code matches a reference ID code;

(iii) setting an alarm condition when the ID code does not match a reference ID code; and (iv) setting the alarm condition when the message does not include the ID code.

14. The system as set forth in claim 13, wherein the conveying means includes:

a first controller for converting the second wireless control signal received by the second receiver into the message;

a first modem responsive to the first controller for transmitting the message to the communication line; and a relay responsive to the first controller for selectively connecting the modem to the communication line.

15. The system as set forth in claim 14, wherein the processing means includes:

a second modem connected to the communication line for receiving the message transmitted by the first modem; and a second controller for acting on the message.

16. The system as set forth in claim 11, wherein the connecting means includes:

a controller for converting the first wireless control signal received by the first receiver into data; and a relay responsive to the controller for selectively connecting/disconnecting the energy source to/from the energy consumption device as a function of the data.

17. The system as set forth in claim 16, wherein:

the relay selectively connects/disconnects the energy source to/from the energy consumption device at one of a predetermined duty cycle and a temperature related to the temperature signal.

18. The system as set forth in claim 11, wherein the communication line includes at least one of a telephone line and a computer network cable.

* * * * *

UNITED STATES PATENT AND TRADEMARK OFFICE
CERTIFICATE OF CORRECTION

PATENT NO. : 6,700,224 B2
DATED : March 2, 2004
INVENTOR(S) : James H. Biskup, Sr. et al.

It is certified that error appears in the above-identified patent and that said Letters Patent is hereby corrected as shown below:

<u>Title page,</u>
Item [56], References Cited, U.S. PATENT DOCUMENTS, insert:

| -- 4,793,553 | B1 | 12/27/1988 | Berman |
| 5,420,567 | B1 | 5/30/1995 | Schwarz |
| 5,475,364 | B1 | 12/12/1995 | Kenet |
| 5,476,221 | B1 | 12/19/1995 | Seymour |
| 5,495,984 | B1 | 3/05/1996 | Santarriaga |
| 5,634,346 | B1 | 6/03/1997 | Ramakrishnan et al. |
| 5,805,063 | B1 | 9/08/1998 | Kackman |
| 5,819,840 | B1 | 10/13/1998 | Wilson et al. |
| 5,850,753 | B1 | 12/22/1998 | Vama |
| 5,924,486 | B1 | 7/20/1999 | Ehlers et al. |
| 5,968,142 | B1 | 10/19/1999 | Frederic |
| 5,986,357 | B1 | 11/16/1999 | Myron et al. |
| 5,996,898 | B1 | 12/07/1999 | Parker et al. |
| 6,005,487 | B1 | 12/21/1999 | Hyatt, Jr. et al. |
| 6,008,726 | B1 | 12/28/1999 | Hagen |
| 6,107,930 | B1 | 8/22/2000 | Behlke et al. -- |

Signed and Sealed this

Twenty-seventh Day of July, 2004

JON W. DUDAS
*Acting Director of the United States Patent and Trademark Office*